United States Patent [19]
Emerson

[11] 4,088,012
[45] May 9, 1978

[54] FUEL INJECTION METERING SYSTEM
[75] Inventor: Reginald Stanley Emerson, Buckingham, England
[73] Assignee: Leslie Hartridge Limited, England
[21] Appl. No.: 772,295
[22] Filed: Feb. 25, 1977
[30] Foreign Application Priority Data
  Mar. 1, 1976  United Kingdom ................ 8108/76
[51] Int. Cl.² ............................................. G01F 9/00
[52] U.S. Cl. ................................................ 73/119 A
[58] Field of Search ........................ 73/119 A, 1 H, 3
[56] References Cited
  U.S. PATENT DOCUMENTS

| | | | |
|---|---|---|---|
| 3,021,703 | 2/1962 | Pfrehm ........................................ 73/3 |
| 3,344,667 | 10/1967 | Maltby ................................. 73/3 UX |
| 3,423,998 | 1/1969 | Blomgren ..................... 73/119 A X |
| 3,577,776 | 5/1971 | Brown .............................. 73/119 A |
| 3,939,688 | 2/1976 | Misch et al. .............................. 73/3 |

Primary Examiner—Jerry W. Myracle
Attorney, Agent, or Firm—Berman, Aisenberg & Platt

[57] ABSTRACT

Metering apparatus for measuring the quantity of fuel oil delivered by engine fuel-injection means when being tested on a test bench or other testing machine embodying or connected to the said metering apparatus, comprising transparent or part-transparent graduates having plungers or pistons within them which, in use of the apparatus, are displaced in one direction by fuel oil delivered from the injection equipment under test to the graduates, and in the other direction by fuel oil (or other liquid, if desired) delivered from a test bench or other source of supply, the plungers or pistons being readily visible so as to give a direct and accurate reading of the quantity of fuel oil delivered to each graduate.

4 Claims, 5 Drawing Figures

FUEL INJECTION METERING SYSTEM

This invention relates to metering apparatus for measuring the quantity of fuel oil delivered by engine fuel-injection means when being tested on a test bench or other testing machine embodying or connected to the said metering apparatus. It is especially applicable to metering systems for use with fuel injection means of the kind in which several pumps are included in one unit and which require the delivery from each pump to be measured simultaneously, such systems being widely used in Diesel engines. The invention is not however restricted to this particular use, and other fuel-injection means may also be used with the metering apparatus of the present invention.

Extensive use has been made over many years of fuel injection metering apparatus having graduates in the form of vertically-arranged transparent tubes which receive and measure the quantity of fuel delivered by fuel injection equipment. A disadvantage however of this form of metering apparatus is that the meniscus formed by the oil in the tubes makes it difficult to take an accurate reading. This may be aggravated by aeration of the oil and vibration. Furthermore, time must be allowed for the oil to settle after being received in the graduate and before being measured. More time must be allowed to drain all the oil from the graduate before taking a further reading. This is inaccurate and inefficient.

Another form of metering apparatus makes use of a cylindrical chamber having a piston or plunger which is displaced by oil which enters the chamber from the fuel injection equipment being tested, the displacement of the piston or plunger being a measurement of the amount of fuel oil delivered by the said equipment. Normally the plunger or piston has a piston rod which is arranged to actuate the stem or other such part of a meter.

The present invention is, in effect, a cross between these two forms of metering apparatus and substantially retains the simplicity of the open graduate type while overcoming its disadvantages.

According to the invention, metering apparatus for measuring the quantity of fuel oil delivered by engine fuel-injection means when being tested on a test bench or other testing machine embodying or connected to the said metering apparatus comprises transparent or part-transparent graduates having plungers or pistons within them which, in use of the apparatus, are displaced in one direction by fuel oil delivered from the injection equipment under test to the graduates, and in the other direction by fuel oil (or other liquid, if desired) delivered from a test bench or other source of supply, the plungers or pistons being readily visible so as to give a direct and accurate reading of the quantity of fuel oil delivered to each graduate.

Examples of metering apparatus in accordance with the invention are shown in the accompanying diagrammatic drawings, in which.

Figure 1:
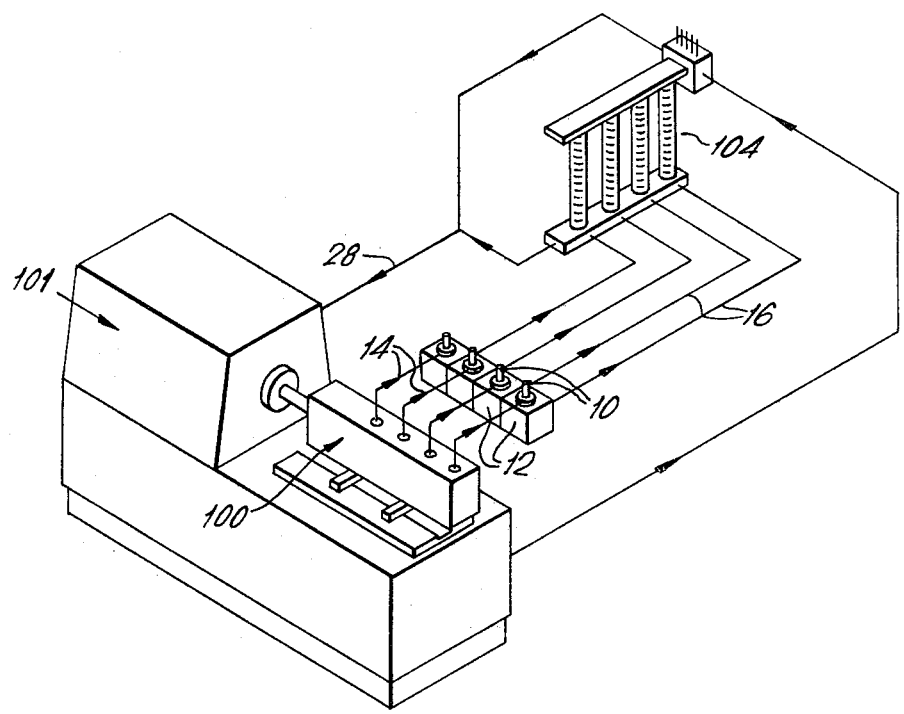
FIG. 1 is a perspective view from above of a test bench associated with one form of apparatus according to the invention.

FIG. 1 shows an injection pump 100 mounted on a test bench 101. The pump 100 delivers fuel oil to injectors 10 each of which sprays into a separate chamber 12. Fuel oil passes from each chamber 12 through ducts 16 to the metering apparatus 104 whence it returns to a tank (not shown) within the test bench.

The metering apparatus 104 is designed to measure the quantity of fuel oil delivered from one or more fuel injectors each receiving fuel from a fuel-injection pump. Such fuel injection equipment is used in Diesel engines on a wide scale, and it is important for it to be tested at intervals of time laid down by the manufacturers in order to determine whether it is delivering the correct quantity of fuel oil for each turn of the pump. One example of the metering apparatus 104 is shhown in greater detail in FIG. 2 where one such fuel injector 10 is held in a holder 12 and is supplied at 14 by fuel from the injection pump (not shown). The delivery side of the injector is connected by a pipe 16 to a duct 17 of a valve block 18, and it will be noted that there are corresponding pipes which likewise serve to connect three other injectors (not shown) to ducts 17a, 17b and 17c of the valve block. It is to be understood that, although the illustrated metering apparatus makes provision for only four injectors to be tested simultaneously, it will be usual for the apparatus to be so designed as to test more than four injectors at a time.

The valve block 18 comprises a fixed part 20 and a sliding part or series of parts 22, movment of the latter serving to control the flow of oil from ducts 17 into ducts 26, each communicating with a gallery 24, or into ducts 32 each communicating with both sizes of graduate 33 and 41 through ducts 35 and 45 respectively. At the same time, the sliding part or parts 22 controls or control flow of oil to ducts 27, each communicating with gallery 29, from ducts 31 each communicating with both sizes of graduate, through ducts 37 and 39. The gallery chamber 24 contains a spring-loaded valve 30 and is connected in turn to a fuel tank or reservoir within the test bench of FIG. 1 by a pipe 28. In addition, the gallery 29 communicates with the return pipe 28.

Transparent graduates are in general use in fuel metering apparatus, but the difference in the present apparatus is that the graduates are always filled with fuel oil and are provided with internal pistons 42, 42a, 42b, and 42c and 43, 43a, 43b and 43c, these pistons having a leak-proof sliding fit. The graduates are in pairs with each pair comprising a large-diameter graduate 33, 33a, 33b and 33c of large capacity and a small-diameter graduate 41, 41a, 41b and 41c of small capacity. The pistons have annular marks 13 and 15 co-operating with suitable graduations 11 and 21. The galleries 52 and 54, each communicating with the upper ends of one size of graduate via ducts 47, 47a, 47b and 47c and 48, 48a, 48b and 48c, lead to a valve block 60 containing four valves 62, 64, 66 and 68. The valve block 60 has a fuel oil inlet 70 from a fuel pump within the test bench of FIG. 1 and also an outlet 72 leading back to the said tank or reservoir.

The metering apparatus shown in FIG. 2 operates as follows:

In the said Figure, the solenoid valves 62 and 68 are closed and the valves 64 and 66 are open in order to raise the pressure above the pistons in all the graduates. Fuel oil from the four injectors 10 enters the ducts 17, 17a, 17b, and 17c respectively. It passes through cavities 40 into ducts 26, gallery 24, valve 30 and, via pipe 28, back to the tank in the test bench.

When it is required to take a reading in the large graduates 33, the solenoid valve 62 is opened and the valve 64 is closed to permit fuel oil above the pistons 42 to escape back to the tank. A control on the test bench is then operated, and a counter (not shown), counting injection pump turns, energises the solenoid 34 which slides the moving part(s) 22 to the right. Ducts 17 now communicate with the ducts 32, and the ducts 26 are closed. Fuel oil enters ducts 32 and, because the solenoid valve 66 is open, thus raising the pressure in graduates 41, it must pass through ducts 35 into the large graduates 33 where it raises the pistons 42. At the termination of a preselected number of injection pump turns, the said counter de-energises the solenoid 34, and the biassing spring 44 returns the sliding part(s) 22 to its, or their, original position, allowing fuel oil to escape through ducts 26 and simultaneously closing ducts 32 so as to trap the fuel oil within the graduates 33. The lines 13 on pistons 42 therefore indicate the respective volumes of fuel oil delivered by each of injections in the said preselected number of injection pump turns.

To return the piston 42 to zero, the solenoid valve 62 is again closed and the solenoid valve 64 again opened to raise the pressure over the pistons 42. The solenoid 36 is then energised and the sliding part(s) 22 moves to the left. Ducts 32 remain closed, but ducts 31 now communicate with ducts 27, allowing the pressure above pistons 42 to carry them back to zero. Solenoid 36 is then de-energised, and biassing spring 38 returns the sliding part(s) 22 to its, or their, central position again.

The apparatus works in a similar manner when it is required to use the small graduates 41 except that the solenoid valves 66 and 68 are operated instead of the solenoid valves 62 and 64.

The adoption of two pairs of ducts 35 and 45 and 37 and 39 causes fuel oil to pass only upwardly in ducts 35 and 45 and only downwardly in ducts 37 and 39, thereby ensuring that any air entering either duct 35 or 45 is purged through ducts 37 or 39 when the pistons return (ducts 37 and 39 are too small in diameter to allow air bubbles to rise upwardly when the fuel oil is static).

Leaf springs 46 hold the sliding part(s) in leak-proof contact with the fixed part 20. They also permit leakage under pressure should the graduates be overfilled.

Figure 2:
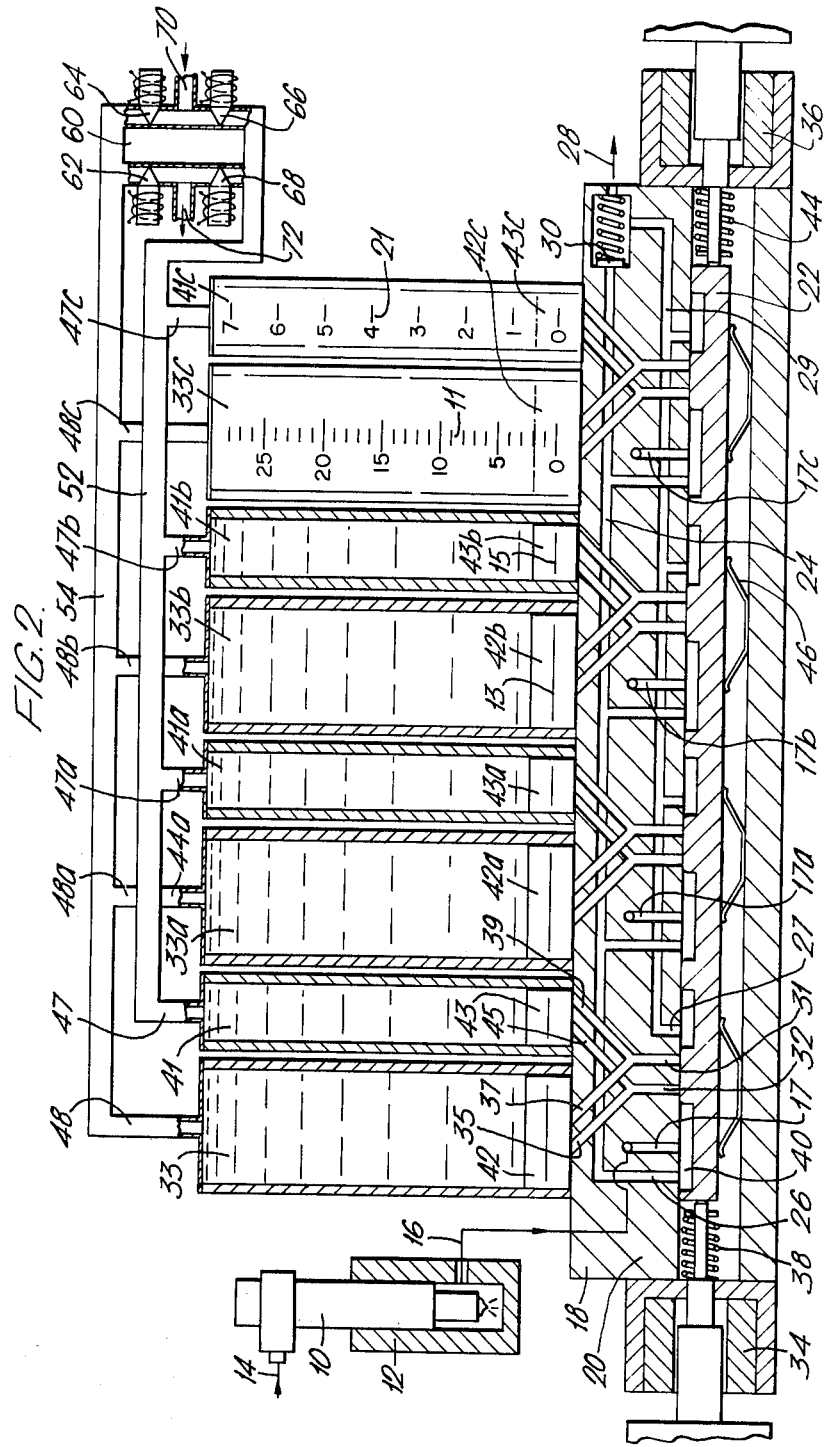
FIG. 2 is a part-sectional front view of the metering apparatus shown in FIG. 1.
Figure 3:
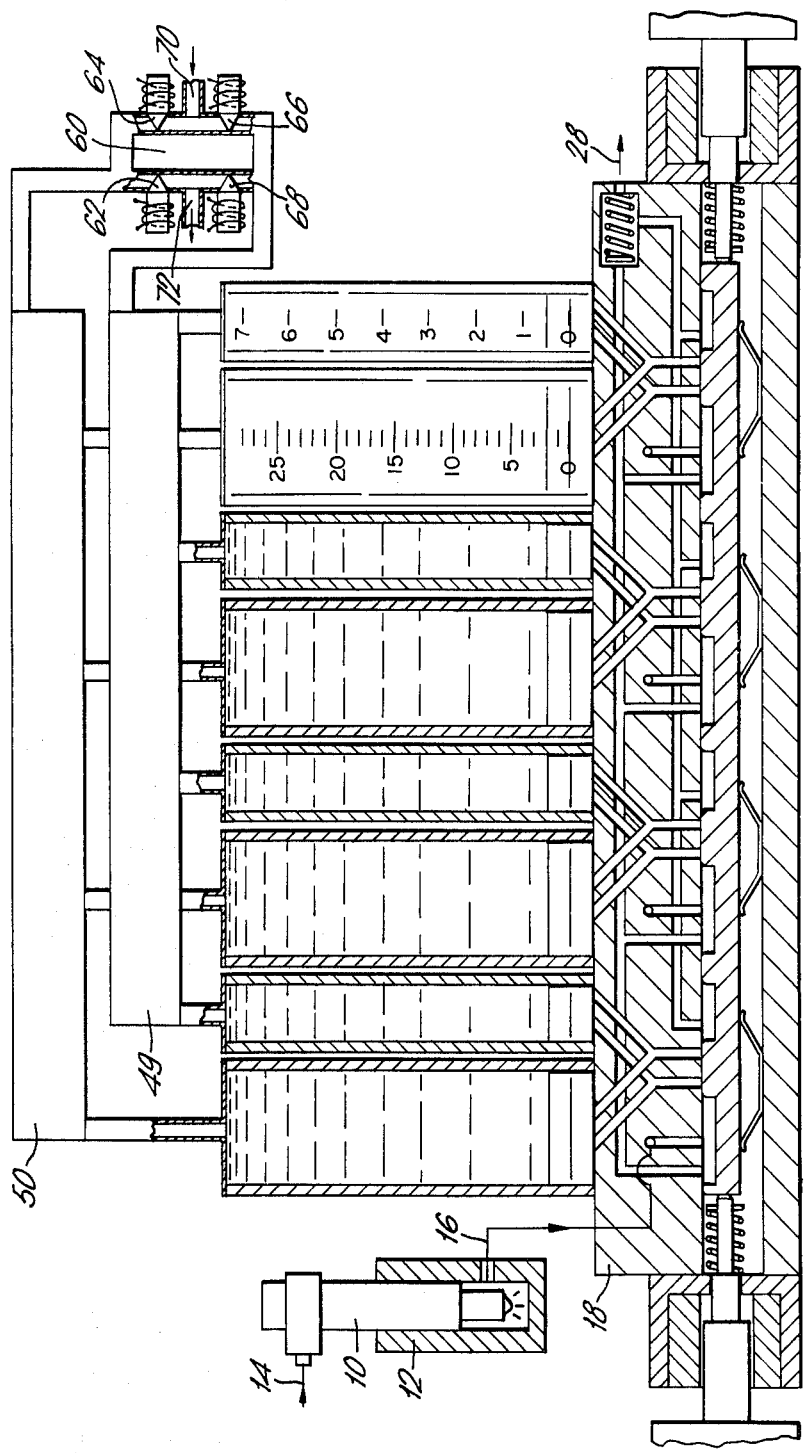
FIGS. 3-5 are views similar to FIG. 2 of three further forms of metering apparatus.

FIG. 3 exemplifies metering apparatus in another form wherein chambers 49 and 50 take the place of the galleries 52 and 54 in FIG. 2. These chambers 49 and 50 have sufficient internal volume to contain more than all the fuel oil displaced by the rising pistons of their respective graduates. In this example, compressed air is fed to inlet duct 70 of valve block 60. The operation is the same as that described above with respect to FIG. 2, but there is the added advantage that there is no requirement for fuel oil to be supplied from the test bench, and compressed air is nearly always available in workshops. Furthermore, the piston return-to-zero time is considerably reduced in practice.

Figure 4:
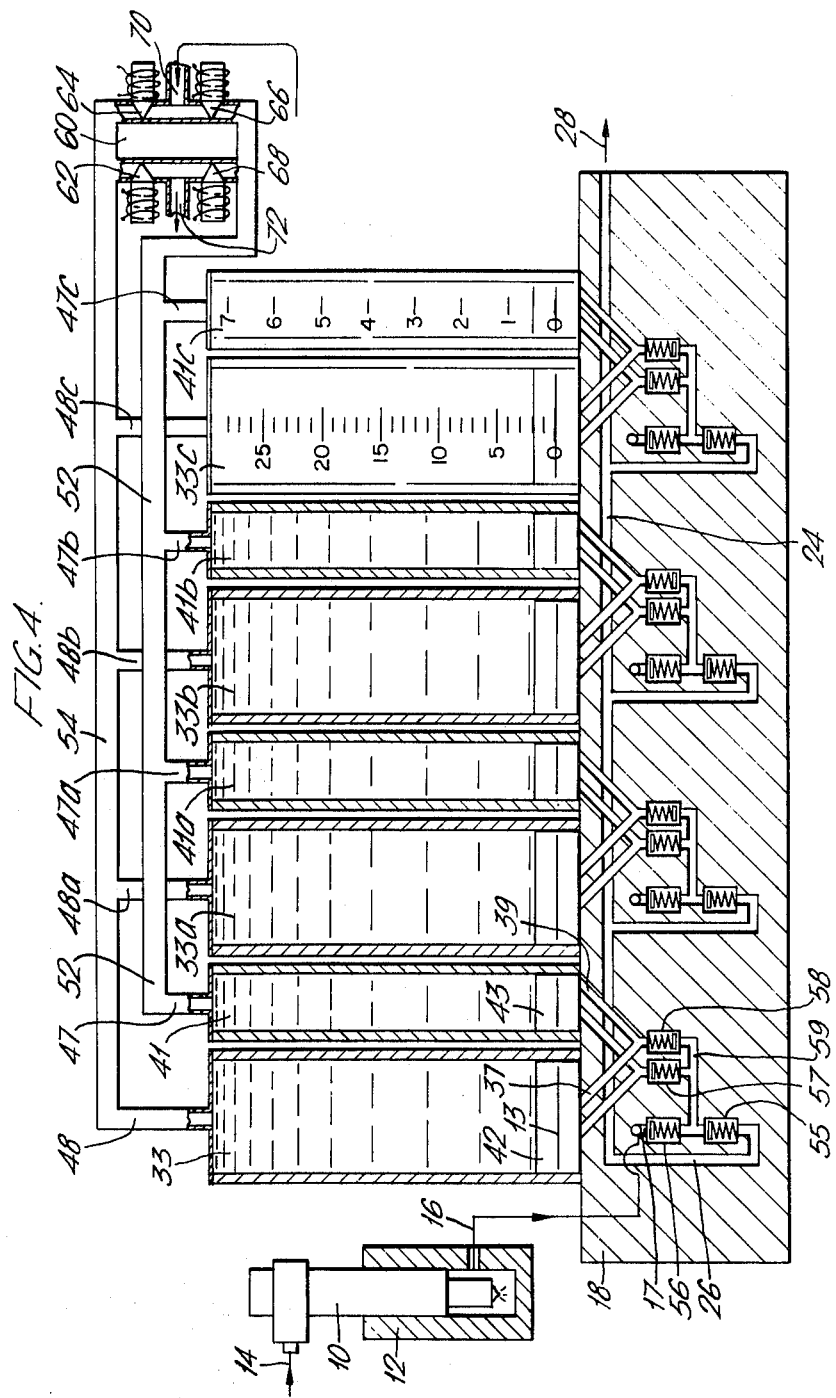

FIG. 4 illustrates yet another form of metering apparatus in which the sliding part(s) 22 of FIG. 1 is, or are, replaced by a number of spring-loaded valves 55, 56, 57 and 58. The valves 55 and 58 flow away from, and the valves 56 and 57 flow towards, common ducts 59. Valves 55 flow towards the common drain gallery 24. Each pair of graduates 33 and 41, 33a and 41a, 33b and 41b and 33c and 41c are associated with similar valve arrangements.

The operation of the apparatus shown in FIG. 4 is as follows:

Let us assume, for example, that valves 56 open at 90 p.s.i, valves 55 at 20 p.s.i, and valves 58 and 59 at 10 p.s.i. Let us also assume that a fuel oil supply from the test bench at 40 p.s.i. is connected at 70. Prior to taking a reading, valves 64 and 66 are open and valves 62 and 68 are closed so that there is a hydraulic pressure of 40 p.s.i. above all the pistons 42 and 43. If it is desired to take a reading in the large graduates 33, valve 64 is first closed so as to trap the fuel oil above the large pistons 42 only and leaving a pressure of 40 p.s.i. above all the small pistons 43.

It is assumed that the injection pump is running and that fuel oil from the injectors 10 is entering ducts 17. Valves 55 raise the pressure in pipes 16 to 90 p.s.i. so as to cause air, which has been liberated from the fuel oil as it is discharged from the injectors at high pressure, to re-dissolve immediately into the fuel oil, thus ensuring that "solid" fuel enters ducts 17. Having entered ducts 59, the fuel oil escapes through valves 55, ducts 26, gallery 24 and through pipe 28 back to the tank. Valves 55 raise the pressure in ducts 59 to 20 p.s.i. so that the pressure of incoming fuel oil in pipe 16 rises from 90 to 110 p.s.i. Valves 58, which open at 10 p.s.i., will open and allow fuel oil to enter ducts 37 and 39 where the pressure will rise to 10 p.s.i. (20-10 p.s.i). The fuel oil above pistons 42 cannot escape and there is a pressure of 40 p.s.i. above the pistons 43; therefore no pistons move.

The operator now operates a control on the test bench which causes a counter, which can count injection pump turns, to open the valve 62, so allowing fuel oil above each of pistons 42 to escape at outlet 72. The pistons 42 are therefore released and they are individually displaced upwardly by the fuel oil issuing from their respective injectors. Pressure in the ducts 37, 59 and 17 will simultaneously fall to, for example, 2, 12 and 102 p.s.i. respectively on the assumption that 2 p.s.i. is required to overcome the friction between the pistons 42 and their graduates 33. At the termination of a preselected number of turns of the injection pump, the counter again closes the valve 62 so as to prevent further escape of fuel oil from the spaces above the pistons 42. The pistons cannot therefore rise further, and pressure in the spaces below pistons 33, ducts 37 and ducts 39 increases above 2 p.s.i. until, at 10 p.s.i, the valves 55 once more open and permit fuel oil from the injectors to escape through ducts 26, gallery 24 and pipe 28 back to the tank.

The lines 13 on the pistons 42 indicate the quantity of fuel delivered by each of the injectors, as already explained in conjunction with FIG. 2. It will be understood that the pressures at which the various valves 55 open cannot all be precisely as intended and that the pressures beneath all the pistons 42 will not be quite equal. There will therefore be a tendency for the piston beneath which the highest pressure prevails to tend to displace fuel oil through its duct 48, through gallery 54 and down that duct 48 associated with the piston 42 beneath which the lowest pressure prevails. But, for actual fuel oil flow to take place, the valve 58 associated with the former piston and the valve 57 associated with the latter piston would need to open. The difference in pressure in the respective two ducts 59 would therefore need to exceed the sum of the opening pressures of these two valves and is amply sufficient to cover the tolerance of opening pressure of the valves 55.

After recording the readings of the pistons 42, the valves 64 are again opened to admit fuel oil at 40 p.s.i. to enter the chambers above all the pistons. The pistons therefore return to zero and are immediately ready for the next reading to be taken.

If the said counter is connected to operate the valve 68 instead of the valve 62, the small pistons 43 will rise after first closing the valve 66.

Figure 5:
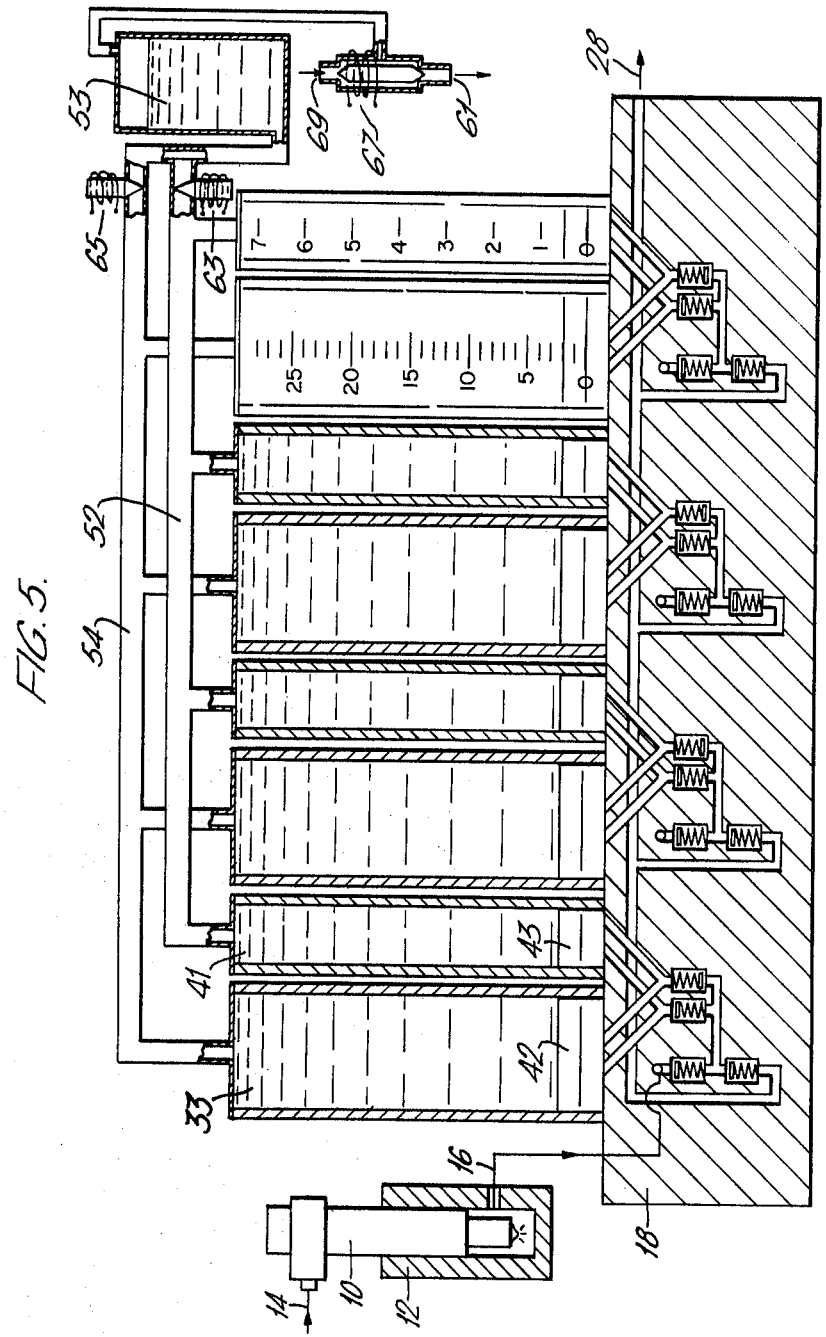

FIG. 5 shows yet another example of the apparatus in which compressed air is used to return the pistons to zero but in a different manner from that illustrated in FIG. 3. A chamber 53 having a capacity greater than the aggregate volume of all the graduates 33 and 41 contains a quantity of fuel oil such that, when all the pistons 42 and 43 are at zero and all the graduates 33 and 41 and the galleries 52 and 54 are full, some fuel oil will still remain in chamber 53. In addition, when all the pistons 42 and 43 indicate the relative maximum readings, some air space will remain at the top of the chamber 53. The valves 63 and 65 interrupt the flow in galleries 52 and 54 respectively, and the three-port valve 67 is arranged to introduce compressed air from inlet 69 at, for example, 40 p.s.i. to the top of chamber 53 and, alternatively, to exhaust the air in the top of the chamber 53 becomes over-filled) at the outlet 61.

The example shown in FIG. 5, operates in the same manner as that shown in FIG. 4, except as mentioned below, but has the advantage that there is no necessity to provide a high flow-rate of fuel oil from the test machine, and also that the pistons return to zero more quickly. With the valve 67 open to air pressure at 40 p.s.i. and the valves 63 and 64 both open, hydraulic pressure is generated above the pistons with sufficient intensity to overcome the sum of the opening pressures of the valves 55 and 58. All the pistons 42 and 43 will therefore remain at, or return to, zero. The valves 63 and 64 are then closed to hold all the pistons 42 and 43 at zero, and valve 67 is reversed to reduce the pressure in chamber 53 to zero.

To take a reading in either one or the other sizes of graduates 33 or 41, the counter in the test bench is connected to the appropriate one of the valves 63 or 65 so that, when the counter control is operated, that valve opens and reduces the pressure over the appropriate set of pistons 42 or 43 to zero. The pistons therefore rise until the counter once more closes the selected valve 63 or 64. The pistons are then arrested from further movement and display their individual readings.

It will therefore be seen that an important novel feature of the different forms of apparatus described above is the use of fuel oil above the pistons (a) for the purpose of controlling the pistons, and (b) to avoid the unsightly appearance of an indeterminate amount of leakage oil which must float on top of the pistons. In FIGS. 2 and 3, the oil above the pistons is used only for returning them to zero. In FIGS. 4 and 5, however, an hydraulic medium (as opposed to an elastic medium like air) is essential in order to lock the pistons at the reading positions.

I claim:

1. In metering apparatus for measuring the quantity of fuel oil delivered by engine fuel-injection means when being tested on a testing machine associated with said metering apparatus, the improvements wherein the apparatus comprises a plurality of at least partly transparent graduates, a displaceable piston within each graduate, each such piston having a leak-proof sliding fit with the respective graduate whereby no fuel oil is able to flow through the graduates, fuel oil supply passages connected to said graduates on one side of each piston to displace the pistons in one direction by fuel oil delivered from engine fuel-injection means under test, and further liquid supply passages connected to said graduates on the other side of each piston to displace the pistons in the other direction by liquid delivered from a source of supply, the pistons in the graduates being readily visible so as to give a direct and accurate reading of the quantity of fuel oil delivered to each graduate.

2. Apparatus according to claim 1 having at least two different sizes of gruadate.

3. Apparatus according to claim 1 having at least one valve to control the supply of fuel oil to be measured to the graduates.

4. Apparatus according to claim 1 comprising means permitting liquid above the pistons to escape from the graduates through valve-controlled passages so that the pistons may be displaced by fuel oil to be measured which enters the graduates below the pistons.

* * * * *